United States Patent [19]

Rivenaes

[11] Patent Number: 5,075,040

[45] Date of Patent: Dec. 24, 1991

[54] AQUEOUS SOLUTIONS ESPECIALLY FOR CLEANING HIGH STRENGTH STEEL

[75] Inventor: Ivar Rivenaes, Ascot, England

[73] Assignee: Denbar, Ltd., St. Heiler, N.J.

[21] Appl. No.: 268,052

[22] Filed: Nov. 7, 1988

[51] Int. Cl.$^5$ .............................................. B08B 3/04
[52] U.S. Cl. .............................. 252/548; 134/22.19; 134/40; 134/42; 252/546; 252/DIG. 14
[58] Field of Search ....................... 252/548, 546; 134/22.19, 40, 41, 42, 3, 20, 29, 38, 2

[56] References Cited

U.S. PATENT DOCUMENTS

| | | | |
|---|---|---|---|
| 2,032,174 | 2/1936 | Johnson | 134/29 |
| 2,671,036 | 3/1954 | Obermeit | 134/20 |
| 3,535,160 | 10/1970 | Arger | 134/22.19 |
| 3,706,676 | 12/1972 | Franke et al. | 252/544 |
| 3,962,151 | 6/1976 | Dekker et al. | 252/548 |
| 4,222,886 | 9/1980 | Connelly, Jr. | 134/3 |
| 4,517,025 | 5/1985 | Plante et al. | 134/38 |
| 4,808,235 | 2/1989 | Woodson et al. | 134/42 |
| 4,834,912 | 5/1989 | Hodgens, II et al. | 134/2 |

Primary Examiner—Asok Pal
Attorney, Agent, or Firm—Weiser & Stapler

[57] ABSTRACT

There are provided improved aqueous chemical cleaning compositions for removing organic and inorganic combustion residues from steel products, said compositions meeting the hydrogen embrittlement potential test criteria set forth in ANSI/ASTM F 519-77. These compositions are of particular utility in cleaning gas turbines in the motoring and running modes. The compositions comprise ethoxylated amines, ethylene diamine tetra acetic acid and demineralized water having a conductivity of or below 0.9 micro mhos. The composition has important application for the aviation and outer-space industries.

32 Claims, No Drawings

AQUEOUS SOLUTIONS ESPECIALLY FOR CLEANING HIGH STRENGTH STEEL

FIELD OF THE INVENTION

Aqueous solutions for the cleaning of high strength steels, in particular, for the cleaning of hot gas turbines.

DESCRIPTION OF THE PRIOR ART

As is known, carbon deposits will always be formed in connection with a combustion process and these deposits, together with other substances which are left behind after the combustion, have always presented a problem of removal from the engine or motor and associated parts. Large portions of these deposits flow out together with the exhaust gas, but build-up of deposits over time is not possible to prevent. On the engines air intake side deposits build-up will also occur due to the impurities in the air intake flow itself. Such fouling will gradually reduce the volume of air flow into the engine, and adversely influence the combustion process itself which consequently will result in more carbon deposits on the engines "hot" side. It appears that it is almost impossible to avoid residues after the combustion process and there gradually occur unavoidable deposits such as permanently burned coke sediments in the combustion zone, as well as on adjacent parts and in adjacent ducts. The deposits consist mainly of unburned fuel portions, as well as non-combustible carbon compounds, certain tar substances, ash substances, sulphur compounds, and the like, which to some extent undergo chemical combination with one another and partly are built as layers, upon each other on the engine parts and gradually form a permanent coating, for example, in the form of coke sediments. Such deposits can be difficult to remove in a ready manner and hitherto, it has been usual to remove such deposits by periodic overhauling of the engine in which the engine is dismantled and manual cleaning is effected by scraping-off and polishing together with a second cleaning of the deposits. Such an engine or motor overhauling is rather time-consuming and makes it necessary to stop the engine for a significant period of time. In the case of marine engines, it is of the greatest importance to be able to avoid such an overhauling of the engine while the ship is at sea, since such engine overhauling means a substantial loss of valuable time, especially for large ships.

Routine motor overhauling with cleaning is necessary at prescribed time intervals, not only in order to reduce the wear on the engine parts but as much to reduce fuel consumption. With a dirty engine, there occurs a noticeable increase in fuel consumption, partly as a consequence of the geometry in the combustion chamber and adjoining ducts being changed on the building-up of the said sediments and deposits and partly as a result of the wearing of the parts and from this subsequent leakage, and due to the fact that the valve parts are fouled and being likely to leak and thereby overdose fuel or change the combustion process in another way, but primarily due to reduced oxygen supply as a result of fouling the engines' air supply system.

The principal advance in this art is set forth in British Patent specification 1,342,077. This patent discloses a formulation comprising a cationic or non-ionic surface active agent, suitably an ethoxylated amine such as Ethomeen (manufactured by Armour and Company Chemical Division) and high-boiling tar acids having a boiling point range of 200° to 280° C., in particular, cresylic acid, together with deionized or demineralized water, and acetic acid for purposes of pH adjustment. This particular cleaning medium has been used most successfully since its in&production. However, it suffers from the disadvantage that it cannot be warranted for the cleaning of gas turbines while these turbines are hot, that is to say, in the motoring or in the running mode. The following U.S. patents have been noted: U.S. Pat. Nos. 3,535,160, 2,955,047, 293,711, 2,671,036, 2,471,390, 2,356,747 2,347,983, and 2,032,174. These patents are not however pertinent to the present improvements.

In 1977, The American Society for Testing and Materials published a standard designated ANSI/ASTM F 519-77 for mechanical and hydrogen embrittlement testing of plating processes and aircraft maintenance chemicals. Prior to the invention disclosed herein, no commercially available combinated hot engine cleaner meets the standards set forth in this protocol. It is well known that when extremely hot steels are exposed to certain aqueous solutions, small amounts of hydrogen are generated which in turn, cause the steel to become brittle. Needless to say, such embrittlement can have disastrous consequences in gas turbines particularly those utilized in aircraft engines. The entire field is surveyed in a publication entitled Whitney Award Lecture of 1987 by R. A. Oriani, (Corrosion 390, 1987).

This ASTM Test is incorporated herein by reference. So is the above-mentioned publication.

Certain currently available solvent or aqueous solutions for gas path cleaning of the turbine engines require that the engine cools down. See for example, Bulletin G28M, published by B & B Chemical Inc., relating to B & B 3100, cleaning composition which requires the engine be cooled to 150° F. before applying the cleaning solution. This aqueous cleaner is designated as being useable in both the motoring and running mode of gas turbines.

Aeromarine TC 200 (American Aeromarine Inc., Fort Lauderdale, Fla.) is stated to be able to be utilized in both the running and motoring modes of gas turbines. It is not claimed to meet the ASTM specification and the requirement for the deionized water to be utilized therewith is specified as 5.0 or more micromhos. Penetone 19 Gas Turbine Compressor Cleaner (Amerace Corporation of Tenafly, N.J.), is designated as utilizable with steam cleaning at the turbine engine inlet. It apparently is not specified for use in the motoring or running mode and a final water wash is recommended. The Rochem "GTE-CC" Fyrewash system is claimed to be utilizable on aviation gas turbines in the running mode. The published specifications do not claim that it meets the aforesaid ASTM standard. The chemical compositions of the foregoing cleaners presently commercially available, other then that set forth in the aforementioned patent, are not matters of public record.

The cleaning solution prepared in accordance with the aforementioned British Patent, when tested in accordance with the aforementioned ASTM F-519 test, was found to cause the test bars to fail in between 8 and 10 hours. Since the ASTM test requires failure not to occur in less than 150 hours, the solution does not meet the prescribed standard.

SUMMARY OF THE INVENTION

There is provided an improved aqueous chemical cleaning composition for removing organic and inorganic combustion residues from steel products, which meets the hydrogen embrittlement potential test set forth in ANSI/ASTM F 519-77.

The composition, in concentrated form, consists essentially of:

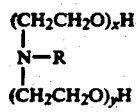

wherein R is an alkyl group having 6 to 20 preferably 12-18, carbon atoms, x and y are integers whose sum ranges between 2 and 50, preferably between 8 and 20, most suitably between 14 and 16; B) ethylene diamine tetra acetic acid (EDTA) and C) demineralized water having a conductivity of or below 0.9 micromhos.

Suitably, the concentrated composition contains mineral ions less than (in parts per million by weight): Lead 0.5, Sodium 5, Potassium 3, Silica 1, Zinc 0.09, Manganese 0.05, Iron 1 and Phosphorus 5. In this concentrate, the ethoxylated amine content exceeds 95% w/w, the EDTA content is between 0.1 and 1.5% w/w, suitably more than about 0.5% w/w, the remainder being the demineralized water whose content exceeds 4% w/w to provide a total of 100% w/w. The concentrated composition has a pH in the range of about 7 to about 9, and may be provided in the range of about 7 to about 7.5 or in the range of about 8.1 to about 9.

It is understood that in accordance with the invention some latitude of the above amounts is allowed providing the composition passes the above-referred-to ASTM test.

The above-described composition is a preferred concentration; it is to be understood and contemplated by the invention that the composition may be more concentrated in which case the concentrations of the mineral ions (and other solids) will be correspondingly higher, and the converse will apply when the concentrate is more dilute so that concentration of the mineral ions (and other solids) will be correspondingly lower.

The improved cleansing composition is generally shipped in concentrated form. While the concentrate meets the hydrogen embrittlement potential test set forth in ANSI/ASTM F 519-77, it is used in dilute form which also meets the hydrogen embrittlement potential test set forth in ANSI/ASTM F 519-77. In order to comply with this standard, dilution must be with water conforming to the foregoing conductivity, and preferably also mineral content standards. Suitably the dilute aqueous composition contains between 25 and 35 gm of the concentrated composition per liter of total dilute composition. The permissible pH ranges for the dilute composition are as above for the concentrate.

Also included in the scope of the present invention are dilute aqueous substantially freeze resistant chemical cleaning composition for removing organic and inorganic combustion residues from steel products at ambient temperatures below 0° C., consisting essentially of: A) the concentrated component consisting essentially of ethoxylated amines, ethylene diamine tetra acetic acid (EDTA) and demineralized water having a conductivity of or below 0.9 micromhos, as described above; B) sufficient antifreeze agent, selected from the group consisting of lower alkanols of 1 to 6 carbon atoms and lower alkylene glycols, wherein the term lower alkylene signifies a chain of 2 to 6 carbon atoms, suitably selected from the group consisting of methanol, ethanol and ethylene glycol and C) demineralized water meeting the standards above. Such a dilute composition is capable of resisting freezing under ambient environmental conditions and still meeting the hydrogen embrittlement potential test set forth in ANSI/ASTM F 519-77. Suitably the dilute aqueous substantially freeze resistant composition contains between 20 and 25% w/w of the antifreeze agent. Further it has a pH in the range of about 7 to about 9 and may have a pH in the range of about 7 to about 7.5 or in the range of about 8.1 to about 9. The dilute aqueous substantially freeze resistant composition contains between 25 and 35 gm of component A) per liter of total composition.

The novel compositions of the present invention discussed above may utilized for the treatment of steel parts in particular engine parts. A particularly useful process comprises cleaning the compressor gas path of a gas turbine which has parts of high strength steel which are in need of having removed therefrom organic and inorganic combustion residues while said turbine is hot and operating, by injecting into said turbine a pressurized flow one of the foregoing compositions, suitably in dilute form, with or without antifreeze, as may be required by the circumstances, thereby cleaning said parts of said residues.

This method of cleaning may be used where the operating mode of the turbine is the motoring mode and the applied pressure of the cleaner is between about 45 and about 50 psi. Where the operating mode is the running mode and then the applied pressure is suitably between about 50 and about 100 psi.

The foregoing method of cleaning the compressor gas path of a gas turbine while said turbine is hot has the advantage that the novel compositions of this invention can be run through the turbine and, while they can leak out of the turbine and, unto other machine components made of materials other than high strength steel located proximate to the turbine, (i.e. the undercarriage of an aircraft), such leakage may occur without negatively affecting such proximate components.

The use of the foregoing cleaning compositions is not limited to cleaning of a running turbine. Any steel parts may be cleaned with the composition. No rinsing step is needed. When a high strength steel part is cleaned of inorganic and organic combustion residues by the application thereto of any of the foregoing compositions, the part is not only clean but capable of meeting the hydrogen embrittlement potential test set forth in ANSI/ASTM F 519-77. Since no wash step is required, when the part dries, a protective residual film, suitably a monomolecular protective residual film is left on its surface. For example, such parts may be gas turbine parts such as a gas turbine blade or other engine parts such as a diesel engine part.

It is evident that the composition of the invention is quite suitable for applications when less stringent and demanding requirements than set forth in said ASTM test are acceptable.

DESCRIPTION OF THE PREFERRED EMBODIMENTS

The novel chemical cleaning compositions in concentrated form, constitute an improvement over the materials for this purpose previously available on the market. This type of material is disclosed in British Patent 1,342,077. A principal difference between the composition of the present invention and that of the prior art, is that the prior art composition contained a complex mixture of high boiling tar acids, derived from the middle oil range in the distillation of coal tar by reaction with a caustic soda solution, removal from the tar fraction, followed by purification recovery from the aqueous solution by acidification. These tar acids are a complex mixture of diethyl phenols/methyl substituted dihydric phenols/propyl and butyl phenols/indenols/naphthols and tetralols, having a boiling point in the range of 230° C. to 280° C.

In accordance with the invention, there is utilized ethylene diamine tetraacetic acid in an amount constituting approximately 0.55% w/w of the concentrated composition. That is to say, approximately 1/10th of the weight of the high boiling tar acids. The remaining portion comprises deionized and demineralized water. As previously, the pH of the concentrate can be adjusted to the desired level, falling between about pH 7 and about pH 9, by the addition of acid, preferably organic acid, most suitably a lower alkanoic acid of 2 to 6 carbon atoms such as acetic acid. None of the boiling tar acids are used.

The ethoxylated amines utilized in the present invention may be obtained from a large number of commercial suppliers in the United States and in other parts of the industrial world. For example, there may be utilized ethoxylated amines manufactured by Croda Chemicals Ltd. of North Humberside, England, under the trademark "Crodamets"; by Lankro Chemicals, Ltd. of Manchester, England, under the trade name of "Ethylan", in particular, "Ethylan TC" and "Ethylan TT-15". Rohm and Haas Company of Philadelphia Pa. markets surfactants of this category under the trademark "Triton RW", "Triton RW-100" being particularly suitable. Also suitable are surfactants sold under the trademark "Ethomeen", in particular, "Ethomeen C-25", manufactured by Armour and Co,. Chemical Division of Chicago. Ethomeen C-25 contains 15 mols of ethylene oxide on average. The fatty acid component of the Ethomeen is a mixture of C8 through C18 acids having approximately 50% by weight of lauryl (C12) residue and approximately 20% by weight of myristyl (C14) residue.

The mineral ion content of both the prior art composition and the compositions of the present invention have been analyzed. The prior art compositions do not meet the ASTM F 519-77 standard, while the compositions of the present invention do meet this standard. The analyses, set forth in Table 1 below show an illustrative mineral content of what is thought to be representative of prior art products, and those for the novel compositions.

TABLE 1

| Ion ppm | Conc. Old | Conc. New "A" | Conc. EtOA "1" | Conc. EtOA "2" | Soln. Old | Soln New "A" |
|---|---|---|---|---|---|---|
| Cl | 0.2 | <0.2 | .. | .. | 0.05 | .. |
| Na | 1.6 | 0.55 | <0.5 | <0.5 | 0.18 | 0.07 |
| K | 0.44 | 0.06 | 0.69 | <0.05 | 0.22 | 0.04 |
| Pb | 0.52 | 0.06 | 0.11 | 0.22 | 0.014 | .. |
| V | <0.01 | <0.10 | .. | .. | 0.005 | .. |
| P | 0.005 | <0.05 | <0.5 | <0.5 | 0.005 | .. |
| Fe | 1.28 | 0.36 | 0.48 | 0.27 | 0.036 | .. |

TABLE 1-continued

| Ion ppm | Conc. Old | Conc. New "A" | Conc. EtOA "1" | Conc. EtOA "2" | Soln. Old | Soln New "A" |
|---|---|---|---|---|---|---|
| Sn | 0.7 | <0.5 | .. | .. | 0.019 | .. |
| Si | <0.5 | <0.02 | .. | .. | <0.01 | .. |
| Al | 0.2 | 0.2 | .. | .. | 0.006 | .. |
| Cu | 0.50 | 0.08 | .. | .. | 0.014 | .. |
| Mn | 0.01 | <0.01 | <0.05 | <0.05 | 0.005 | .. |
| Ca | <0.01 | <0.1 | <0.50 | <0.50 | <0.01 | .. |
| Mg | 0.03 | 0.01 | .. | .. | 0.002 | .. |
| Zn | .. | .. | 0.69 | 0.69 | .. | .. |

Conc. Old: Wash concentrate per UK Patent;
Conc. New "A": Wash concentrate per present invention;
Conc. EtOA "1": First commercial sample of ethoxylated amine;
Conc. EtOA "2": Second commercial sample of ethoxylated amine;
Soln. Old: Diluted solution from wash concentrate per UK Patent;
Soln. New "A": Diluted solution from wash concentrate per present invention.

The results of comparative tests are shown below:

TEST OF PRIOR ART CLEANSER

Submitted: 800 ml. of R-Mc ready to use concentrate.
Requested: Test to Douglas CSD#1 Hydrogen Embrittlement.
Method: American Society for Testing and Materials ASTM F 519, Type 1c.

RESULTS OF TEST

Three bars prepared and tested to the requirements of ASTM F 519, Type 1c revealed the following failure mode.

| Bar 1 | Failure 8 hours |
| Bar 2 | Failure 16 hours |
| Bar 3 | Failure 10 hours |

Due to failure in less than the 150 hours prescribed by ASTM F 519, this product is not acceptable for aircraft use.

TEST OF EXAMPLE 1 PRODUCT

Submitted: R-Mc G;-21 Ready to use concentrate
Requested: Test to Douglas CSD #1 Hydrogen Embrittlement.
Method: American Society for Testing and Materials ASTM F 519, Type 1c.

RESULTS OF TEST

Three bars prepared and tested to the requirements of ASTM F 519, Type 1c revealed the following:

| Bar 1 | Did not break 150 hours |
| Bar 2 | Did not break 150 hours |
| Bar 3 | Did not break 150 hours |

Standard Method for Mechanical Hydrogen Embrittlement Testing of Plating Processes and Aircraft Maintenance Chemicals F519-77.

This is the standard method useful where strict controls must be maintained during production operations such as surface preparation and plating to prevent hydrogen embrittlement during the manufacture of high-strength steel parts. The test is also useful where it is required to determine the hydrogen embrittlement potential of cleaners, paint strippers, and other maintenance chemicals that may contact high-strength steel parts during service life.

The following apparatus and materials are required:
a loading device, as shown in FIG. 8, at page 11 of the ASTM F 519-77 test;
aluminum oxide, 150 (or finer) and 180 grit;
clean shot, size P-190 or S-230 in accordance with MIL-S-851;
a corrosion-preventive compound, meeting the requirements of MIL-C/16173, Grade 2 (or equivalent);
chromic acid; and test compositions.

A minimum of three notched round bars were used per test and conformed to the dimensions for Type 1c as described in FIG. 3, at page 8 of the ASTM F 519-77 test.

The material was AISI 4340 steel in accordance with MIL-S-5000 and heat treated to a tensile strength between 260 and 280 ksi (1800 and 1930 MPa) in accordance with MIL-H-6875F. The 0.2% offset yield strength was at least 80% of the ultimate strength.

The bars were machined to size after heat treatment. Crush grinding was use to produce the notch.

Light aluminum oxide blase using 150 grit (or finer) $Al_2O_3$ was applied after final heat treatment and again after shot peening and used 3/8 to ½ in. nozzle, 30 to 50 psi (210 to 345 kPa) air pressure, approximately 10 in. (250 mm) from part surface and moved continuously.

Acid or cathodic electrolytic cleaning, and straightening or grinding after final heat treatment was not performed.

The bars were considered suitable for test purposes if a sampling and inspection was in conformance to the requirements as shown in Table 1, at page 5 of the ASTM F 519-77 test.

All specimens were protected with a corrosion-preventive compound and stored in such a manner as to prevent corrosion.

The device used to subject the notched round bars to bending levels is as shown in FIG. 8, at page 11 of the ASTM F 519-77 test. The procedure loading methods are as follows:

1. Each device was calibrated by counting the number of turns of the loading bolt required to fracture the specimens. Counting was started at the point where the tightening of the loading bolt first eliminated all slack in the mechanism and this position of the loading bolt was noted, and the distance was measured between the loading bars at each end to ensure that the same starting point was used for each loading. Stress levels were then indicated as a percentage of the average number of turns required to cause failure in the calibration process.

2. The aqueous chemical cleaning compositions comprising ethoxylated amines, EDTA and demineralized water having a conductivity of or below 0.9 micromhos were tested in concentrated form and in diluted form so as to contain 25 grams of the concentrated composition per liter of total dilute composition. Dilution must be made with water or with a suitable antifreeze composition, preferably methanol, ethanol or ethylene glycol having a conductivity below 0.9 micromhos, and preferably also mineral content standards.

All tests were conducted at the operating temperature of the material.

Specimens were degreased and abrasive blasted with 180-grit aluminum oxide. The cleaned specimens were rinsed free of abrasive with tap water. Without drying, the specimens were electroplated using the low-embrittlement cadmium cyanide bath (Treatment B, Table A1 in Annex A1). Cadmium-electroplated specimens were rinsed in tap water and then rinsed by immersing and swirling for 15 s in a solution containing 5 lb. (2.3 kg) of chromic acid to 10 gal. (38L) of water. The chromic acid was removed from the specimens by rinsing in cold tap water followed by hot tap water rinse and dried. The cadmium-electroplated specimens were then placed in an oven at 375+25° F. (191+4° C.) for 23 h minimum.

A minimum of three bars to 45% of the bend strength as described in FIG. 8, at page 11 of the ASTM test were loaded.

The test solution was put into a clean plastic container, the stressed bars placed in the test solution, and the time to failure recorded if less than 150 hrs.

Since no failure occurred in less than the 150 hours prescribed by ASTM F 519, this product is acceptable for aircraft use.

Since it has been Applicant's empirical finding that the compounds of the present invention will meet the ASTM standard, provided that the water utilized in making both the concentrate and the diluted forms of the cleaning composition does not exceed 0.9 micro mhos conductivity, the low mineral content of the composition as a whole can be considered to be critical. The compositions of the present invention are, generally speaking, shipped as concentrate and then diluted with demineralized water or, when the environmental conditions so require, with the demineralized water and a suitable antifreeze composition, preferably methanol, ethanol or ethylene glycol, to provide the working cleanser. Any other freezing point depressant may also be used providing the ASTM test will still be met.

A principal, but not sole use of the dilute aqueous compositions is for washing gas turbines. The cleansing compositions are injected into the turbines which may be either in the motoring or the running mode, by methods which are well known in the art, but are specifically set forth in the sales technical manual published by Ivar Rivenaes A/S of Bergen, Norway; further technical data sheets relating to the mode of using the prior art product (designated R-MC) are published by ECT Incorporated of King of Prussia, Pa., and designated R1 thru R5, all of which are incorporated herein by reference. The methods disclosed therein are equally applicable to the novel compositions of the present invention.

Certain washing environments may require different pH levels for the cleaning solutions. Thus, while the solutions generally have a pH in the range of about 7 to about 9 (or equivalent acids thereof), the pH can be readily adjusted with any of the aforementioned acids to the desired level.

It will be understood by those skilled in the art that a gas turbine will generate different level of internal pressure when in the motoring mode than in the running mode. In the former, the pressures are lower than in the latter. Thus, since the cleaning solutions must be injected into the operating gas turbine, suitably into the compressor section thereof, the cleaning solutions must be injected at a sufficient overpressure to permit them to pass through the motor. In the motoring mode, a rather low level of internal suction pressure is generated in the turbine. Therefore, an applied pressure of between about 45 to about 50 psi is necessary to force the cleaning fluid through. On the other hand, when the turbine is in the running mode, it generates a larger amount of pressure and applied pressure of only about 50 to about 100 psi is required.

The cleansing solutions of the present invention may also be utilized to clean any other steel parts, including high strength steel parts, such as those used in reciprocating engines such as diesel engines. Where such parts are to be cleaned, either the part itself is heated or the solutions themselves are heated and sprayed onto the part to be cleaned with an appropriate high pressure spray, which either scrubs the parts alone or washes them with the assistance of brushing devices.

The following examples are illustrative of the invention but they should not in any way be considered as limiting the invention thereto.

EXAMPLE 1

| Formula for Gas Turbine/Engine Wash | |
|---|---|
| Ethoxylated Amines[1] | 2,622 kilos |
| Demineralized Water | 116.2 kilos |
| EDTA | 15.2 kilos |
| Total | 2,753.4 kilos |

[1]Of the type shown above.

Of the foregoing concentrate 3.53 kilos will make up 110 liters of working solution for use above about +5° C. In environments below +5° C. but above −20° C., between 20 and 25% of the final composition comprises ethylene glycol.

In accordance with the above formulation but using Ethylan TC in place of Ethomeen C25, a product of similar quality is obtained. Similarly, in accordance with the above formulation but using ascorbyl palmitate in place of EDTA, a product of similar quality is obtained.

Various other substitutions can be made by one skilled in the art, as well as different amounts used, providing the final composition will meet the ASTM test.

EXAMPLE 2

Use of cleanser for aircraft turbine

The cleansing fluid (diluted) of Example 1 is loaded into an RM-C Compressor provided with a 25 gallon tank and nozzle spray. The nozzle spray is attached to the engine intake cowl of a Rolls Royce Dart engine with two cowling clips. The wash rig is placed under the aircraft wing tip and the hose secured to the undercarriage leg. 6 gallons of cleanser are loaded into the tank which is then closed. The engine is then started and run at 8,000 rpm with fuel trim set at 100%. The compressor is started and cleanser injected at the rate of 1.5 gallons/minute at 40 psi. The engine rpm will drop to 7,000 rpm during the injection. After 4 minutes the compressor is switched off. Engine rpms then increase to 8,000 rpm. When cleanser flow from the engine stops the engine is stopped, the nozzle spray removed and the engine run at 13,000 rpm with fuel trim at 0% for 15 minutes. The engine is then stopped.

It is recommended that aircraft gas turbine be washed by the above method every 150 running hours as an average. This can increase the time allowed between required strip-down maintenance overhauls by about 2,500 hours.

It is to be understood and contemplated by the invention that all conventional additives or ingredients or components may be added to the composition providing the final concentrated or dilute composition will meet the ASTM test for applications where the test standards must be met.

From the above description, it will become apparent to the reader that this invention makes an important contribution to technology in particular to safety in the aviation and outer-space industries, for commercial and other applications. As described in the publication referred to above in the Witney Award Lecture, deleterious effect of hydrogen on steels include the production of blisters and flaking. Both can result from stresses generated by the precipitation of dissolved hydrogen during the cooling of steel from hot-forging temperatures. Blisters can also be caused by the charging of hydrogen into steel by applying a cathodic current or by a corrosion reaction. In all these instances, internally dissolved hydrogen at very high thermodynamic activity is generated so that gaseous molecular hydrogen of very high fugacity precipitates at pre-existing microcracks and voids in the steel. The associated large mechanical pressures of the hydrogen gas force the growth of these defects in the steel by plastic deformation or cleavage.

It is readily apparent how dangerous and insidious the adverse effects of hydrogen on steel can be, and how the advance in technology provided by the invention contributes to the solution of this serious problem and to safety in general.

I claim:

1. An improved highly concentration of ethoxylated amine-containing aqueous chemical cleaning composition, containing at least 95% by weight said ethoxylated amine, for removing organic and inorganic combustion residues from steel products, and minimizing hydrogen embrittlement of the steel products said composition not resulting in hydrogen embrittlement and failure of AISI 4340 steel in less than 150 hours.

2. A composition of claim 1 in concentrated form consisting essentially of ethoxylated amines of the formula:

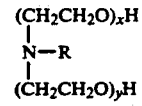

wherein R is an alkyl group having 6 to 20 carbon atoms, x and y are integers whose sum ranges between 2 and 50, ethylene diamine tetra acetic acid(EDTA) and demineralized water having a conductivity of or below 0.9 micromhos, wherein the ethoxylated amine content exceeds 95% w/w, and the EDTA content is between 0.1 and 1.5% w/.w.

3. The composition of claim 2 wherein x+y is a mineral in the range of 8 through 20.

4. The composition of claim 2 wherein x+y has an average value of 14 through 16.

5. The composition of claim 2 having a pH in the range of about 7 to about 9.

6. The composition of claim 2 having a pH in the range of about 7 to about 7.5.

7. The composition of claim 2 having a pH in the range of about 8.1 to about 9.

8. The composition of claim 2 wherein the ethoxylated amine content exceeds 95% w/w, and the EDTA content exceeds 0.5% w/w and the demineralized water content exceeds 4% w/w to a maximum of 100% w/w.

9. The composition of claim 2 containing mineral ions less than the parameters set forth below in parts per million by weight:

| Lead | 0.5 |
|---|---|
| Sodium | 5 |
| Potassium | 3 |
| Silica | 1 |
| Copper | 0.5 |
| Manganese | 0.05 |
| Iron | 1 |
| Phosphorus | 5 |

10. An improved concentrated aqueous chemical cleaning composition for removing organic and inorganic combustion residues from steel products, and minimizing hydrogen embrittlement of the steel products said composition not resulting in hydrogen embrittlement and failure of AISI 4340 steel in less than 150 hours, having a pH in the range of 7 to 9, consisting essentially of ethoxylated amines of the formula:

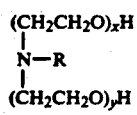

wherein R is an alkyl groups having 12 to 18 carbon atoms, x and y are integers whose sum ranges between 14 and 16, ethylenediaminetetraacetic acid (EDTA) and demineralized water, having a conductivity of or below 0.9 micromhos, said composition containing mineral ions less than the parameters set forth below in parts per million by weight:

| Lead | 0.5 |
|---|---|
| Sodium | 5 |
| Potassium | 3 |
| Silica | 1 |
| Copper | 0.5 |
| Manganese | 0.05 |
| Iron | 1 |
| Phosphorus | 5 | wherein the ethoxylated amine content exceeds 95% w/w, and the EDTA content exceeds 0.5% w/w and the demineralized water content exceeds 4% w/w to a total of 100% w/w.

11. The dilute aqueous composition containing between 25 and 35 gm of a composition of claim 10 per liter of total composition and demineralized water meeting the standards of claim 10, said dilute composition not resulting in hydrogen embrittlement and failure of AISI 3430 steel in less than 150 hours.

12. A dilute aqueous chemical cleaning composition for removing organic and inorganic combustion residues from steel products, and minimizing hydrogen embrittlement of the steel products which comprises:
A) a concentrated component consisting essentially of ethoxylated amines of the formula:

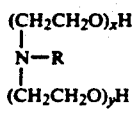

wherein R is an alkyl group having 6 to 20 carbon atoms, x and y are integers whose sum ranges between 8 and 20, ethylenediaminetetraacetic acid (EDTA) and demineralized water having a conductivity of or below 0.9 micromhos, wherein the ethoxylated amine content exceeds 95% w/w, and the EDTA content exceeds 0.5% w/w and the demineralized water content exceeds 4% w/w to a total of 100% w/w of said concentrated component, and
B) demineralized water meeting the standards of A) above, said dilute composition not resulting in hydrogen embrittlement and failure of AISI 4340 steel in less than 150 hours.

13. The composition of claim 12 having a pH in the range of about 7 to about 9.
14. The composition of claim 12 having a pH in the range of about 7 to about 7.5.
15. The composition of claim 12 having a pH in the range of about 8.1 to about 9.
16. The dilute aqueous composition of claim 12 containing between 25 and 35 gm of component A) of claim 12 per liter of total composition.
17. The composition of claim 12 containing less mineral ions than the parameters set forth below in parts per million by weight:

| Lead | 0.06 |
|---|---|
| Sodium | 0.6 |
| Potassium | 0.3 |
| Silica | 0.03 |
| Copper | 0.09 |
| Manganese | 0.03 |
| Iron | 0.4 |
| Phosphorus | 0.6 |

18. A dilute aqueous substantially freeze-resistant chemical cleaning composition for removing organic and inorganic combustion residues from steel products at ambient temperatures below 0° C., and minimizing hydrogen embrittlement of the steel products consisting essentially of:
A) a concentrated component consisting essentially of ethoxylated amines of the formula:

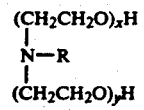

wherein R is an alkyl group having 6 to 20 carbon atoms, x and y are integers whose sum ranges between 8 and 20, ethylenediaminetetraacetic acid (EDTA) and demineralized water having a conductivity of or below 0.9 micromhos, wherein the ethoxylated amine content exceeds 95% w/w, and the EDTA content exceeds 0.5% w/w and the demineralized water content exceeds 4% w/w to a total of 100% w/w of said concentrated component,
B) sufficient antifreeze agent, selected from the group consisting of lower alkanols of 1 to 6 carbon atoms and lower alkylene glycols, wherein the term lower alkylene signifies a chain of 2 to 6 carbon atoms, and
C) demineralized water meeting the standards of A) above, said dilute composition being capable of resisting freezing under ambient environmental conditions and not resulting in hydrogen embrittlement and failure of AISI 4340 steel in less than 150 hours.

19. The dilute aqueous substantially freeze resistant composition of claim 18 wherein the antifreeze agent is selected from the group consisting of methanol, ethanol and ethylene glycol.

20. The dilute aqueous substantially freeze resistant composition of claim 18 containing between 20 and 25% w/w of the antifreeze agent.

21. The dilute aqueous substantially freeze resistant composition of claim 18 having a pH in the range of 7 to 9.

22. The dilute aqueous substantially freeze resistant composition of claim 18 having a pH in the range of 7 to 7.5.

23. The dilute aqueous substantially freeze resistant composition of claim 18 having a pH in the range of 8.1 to 9.

24. The dilute aqueous substantially freeze resistant composition of claim 18 containing between 25 and 35 gm of component A) of claim 18 per liter of total composition.

25. The dilute aqueous substantially freeze resistant composition of claim 18 containing less mineral ions than the parameters set forth below, in parts per million by weight:

| | | |
|---|---|---|
| Lead | 0.06 | |
| Sodium | 0.6 | |
| Potassium | 0.06 | |
| Silica | 0.03 | |
| Copper | 0.09 | |
| Manganese | 0.01 | |
| Iron | 0.4 | |
| Phosphorus | 0.6 | |

26. The method of cleaning the compressor gas path of a gas turbine which has parts of high strength steel which are in need of having removed therefrom organic and inorganic combustion residues while said turbine is hot and operating which comprises injecting into said turbine a pressurised flow of a composition of claim 12 thereby cleaning said parts of said residues.

27. The method of cleaning of claim 26 wherein the operating mode is the motoring mode and the applied pressure is between 45 and 50 psi.

28. The method of cleaning of claim 26 wherein the operating mode is the running mode and the applied pressure is between 50 and 100 psi.

29. The method of cleaning, at environmental temperatures below 0° C., the compressor gas path of a gas turbine which has parts of high strength steel which are in need of having removed therefrom organic and inorganic combustion residues while said turbine is hot and operating which comprises injecting into said turbine a pressurised flow of a composition of claim 18 thereby cleaning said parts of said residues.

30. The method of cleaning, at environmental temperatures below 0° C., of claim 29 wherein the operating mode is the motoring mode and the applied pressure is between 45 and 50 psi.

31. The method of cleaning, at environmental temperatures below 0° C., of claim 29 wherein the operating mode is the running mode and the applied pressure is between 50 and 100 psi.

32. The method of cleaning the compressor gas path of a gas turbine which has parts of high strength steel which are in need of having removed therefrom organic and inorganic combustion residues while said turbine is hot and located proximate to other machine components made of materials other than high strength steel without negatively affecting said proximate components which comprises subjecting said turbine to the method of claim 26 or 29.

* * * * *